United States Patent [19]

Rosenthal

[11] Patent Number: 5,073,933
[45] Date of Patent: Dec. 17, 1991

[54] X WINDOW SECURITY SYSTEM

[75] Inventor: David S. H. Rosenthal, Palo Alto, Calif.

[73] Assignee: Sun Microsystems, Inc., Mountain View, Calif.

[21] Appl. No.: 444,663

[22] Filed: Dec. 1, 1989

[51] Int. Cl.$^5$ .................. H04L 9/30; G06F 13/14
[52] U.S. Cl. .......................... 380/25; 380/4; 380/23; 380/30; 380/49; 395/157
[58] Field of Search ... 364/200 MS File, 900 MS File, 364/518, 521, 522; 380/23, 25, 29, 30, 49, 50, 3-5

[56] References Cited

U.S. PATENT DOCUMENTS

| | | | |
|---|---|---|---|
| 4,896,291 | 1/1990 | Gest et al. | 364/900 |
| 4,903,218 | 2/1990 | Longo et al. | 364/521 |
| 4,928,247 | 5/1990 | Doyle et al. | 364/518 |

FOREIGN PATENT DOCUMENTS

| | | |
|---|---|---|
| 0254854-A2 | 2/1988 | European Pat. Off. . |
| 2181281-A | 4/1987 | United Kingdom . |

OTHER PUBLICATIONS

Meyer, Malytas, *Cryptography: A New Dimension in Computer Data Security*, John Wiley & Sons, 1982, pp. 32-33, 48-53, 392-394.

Denning, *Cryptography and Data Security*, Addison-Wesley, 1982, pp. 117-125.

P. Forme, "PC/NOS: Un Reseau Local Pas Comme Les Autres"; Micro-Systems, (Nov. 1986; pp. 94-97; In French).

Primary Examiner—Bernarr E. Gregory
Attorney, Agent, or Firm—Blakely Sokoloff Taylor & Zafman

[57] ABSTRACT

The method of rendering an X Windows server system running on a server and at least one host computer terminal secure including the steps of allowing users to view only resources of the X Windows server system the use of which has been specifically authorized to that user, and allowing users to manipulate only resources of the X Windows server system the use of which has been specifically authorized to that user.

10 Claims, 2 Drawing Sheets

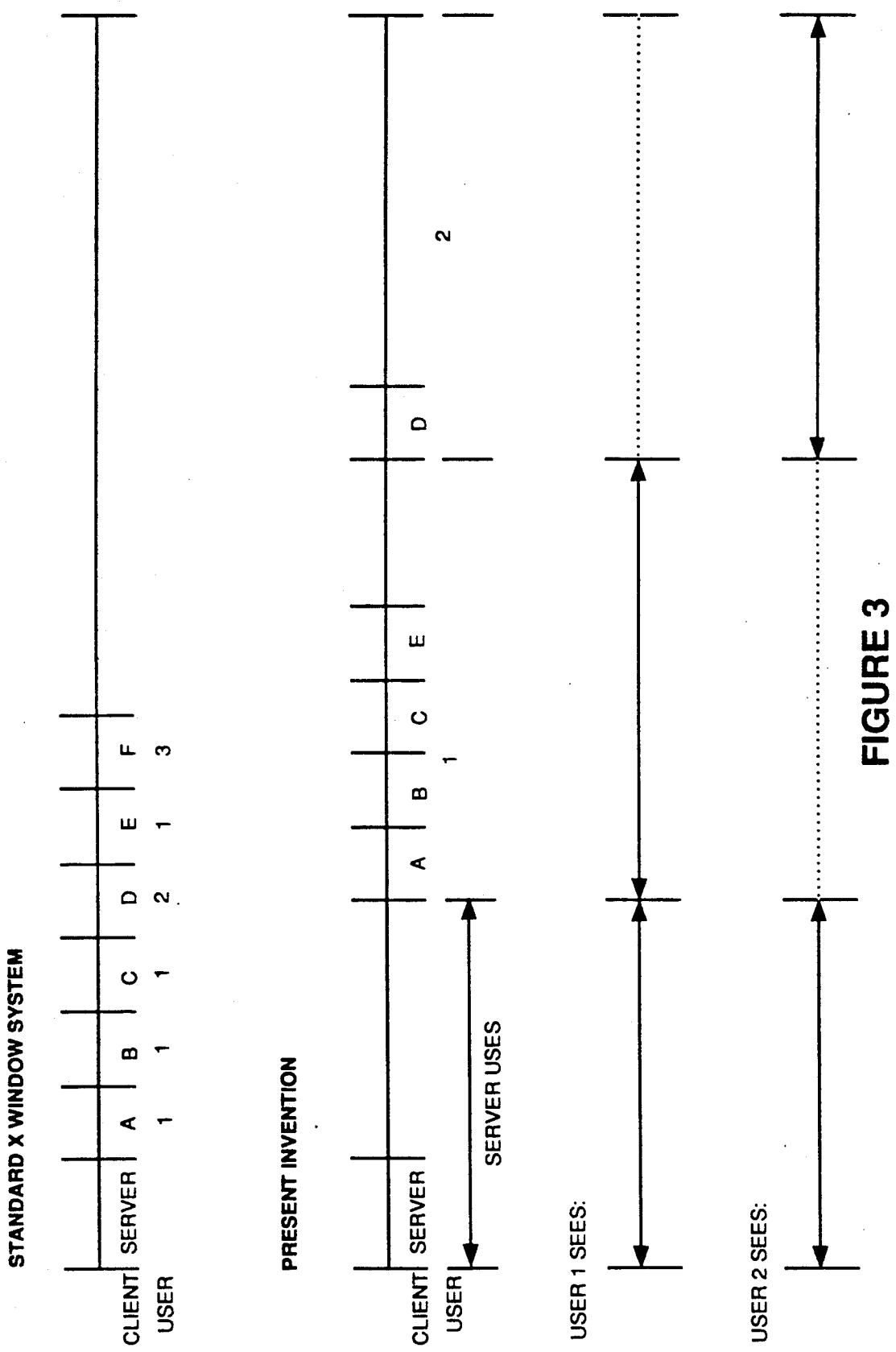

X WINDOW SECURITY SYSTEM

BACKGROUND OF THE INVENTION

1. Field of the Invention

This invention relates to networked window systems and, more particularly, to a method and apparatus for rendering the X Window System more secure.

2. History of the Prior Art

Arranging individual computer work stations in a network is desirable for a number of reasons. Such an arrangement allows a number of different individuals to work together on the same piece of work. It allows the sharing of high cost computer assets such as printers, character readers, central memory and other resources which might be under-utilized by individuals operating individual work stations. Windowing systems, on the other hand, are desirable for both individual work stations and networks because they allow users to run a number of processes essentially simultaneously whether by time sharing a single central processing unit or by utilizing a plurality of processors to implement individual processes. Window arrangements provide, in effect, a plurality of displays appearing together or separately on an individual computer output display, each such display or window displaying one of a number of what may be simultaneously operating applications.

There have been a number of networking systems devised with windowing capabilities. One of the most recent such systems is the X Window System developed by Schiefler and Gettys at the Massachusetts Institute of Technology as a system for sharing university computer resources. The X Window System has become quite popular because it can be utilized with different types of computers and it allows users to tailor interfaces to the particular application or network involved. The X Window System is, in many respects, like an operating system which runs on a centralized server, providing its facilities to all of the users networked to that server.

One problem with the X Window System is that it is insecure in at least two respects. There is no control over who may access the resources of the system nor over what they may do with the resources once access has been gained. The gaining of access is referred to herein as "authorization." The restricting of operations by an "authorized" user is referred to herein as "access control." Although it attempts to limit gaining access to authorized users, the X Window System does so by allowing only certain computers called hosts, the names for which are held in the server, to access that server. Any intruder who has gained access to any of these computers then has unrestricted access to the server. For example, the intruder may observe a user's key strokes, button pushes, and mouse motions; and monitor any output visible on the display. Such an intruder can disrupt the normal operation of the applications by the user in any of a number of ways, for example, by destroying the user's windows.

The X Window System was designed for use in a university environment in which the overhead of sophisticated resource protection mechanisms was considered inappropriate. However, the X Window System now finds itself used in situations where industrial and governmental espionage are serious considerations and where the pernicious snooping and interference with computer programs is well-known. This expanded use of the X Window system highlights the need of that system for arrangements to make the system more secure.

SUMMARY OF THE INVENTION

It is, therefore, an object of this invention to limit the persons authorized to use the X Window System.

It is another object of the present invention to limit the resources available to authorized users of the X Window system.

It is an additional and more particular object of the present invention to limit the resources available to authorized users of the X Window system to selected resources without indicating to such users that additional resources are available to others.

These and other objects of the present invention are realized in the present invention by a method of rendering an X Windows server system running on a server and at least one host computer terminal secure comprising the steps of allowing users to view only resources of the X Windows server system the use of which has been specifically authorized to that user, and allowing users to manipulate only resources of the X Windows server system the use of which has been specifically authorized to that user or to a server manager.

These and other objects and features of the present invention will be better understood by reference to the detailed description of the invention which follows taken together with the drawings in which like elements are referred to by like designations throughout the several figures.

BRIEF DESCRIPTION OF THE DRAWINGS

FIG. 3 is a diagram illustrating the allocation of resources in an X Window System in accordance with the present invention.

NOTATION AND NOMENCLATURE

Figure 1:
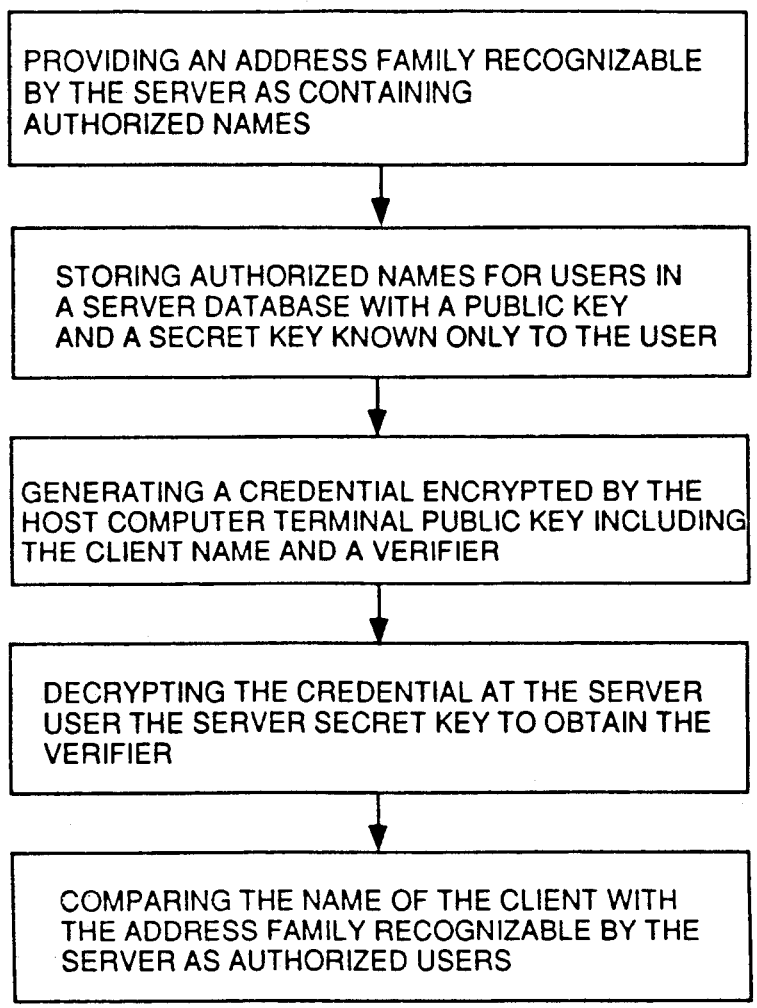
FIG. 1 is a flow chart describing the operation of the invention in broad detail.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to method steps for operating a computer in processing electrical or other (e.g. mechanical, chemical) physical signals to generate other desired physical signals.

DETAILED DESCRIPTION OF THE INVENTION

1. General Solution to the Authorization Problem

The X Window System presently functions to allow access to host computers which may be connected to the server. The names of those host computers are stored in the server. By default, only programs on the local host computer and the host computers specified in an initial list can use the system. When a user attempts to use resources on the server, he need only use one of the host computers to be authorized to use the server and all of its resources. Moreover, a client on the local host (the host computer physically at the server) can change the access control list.

An X server can simultaneously use a number of different networking systems to communicate with the hosts running its clients. A client is a program running on a host computer. Each networking system will have its own way of running hosts, and X defines these ways as "address families."

A number of techniques have been developed to replace or augment this "host-based" authentication with a "user-based" authentication system which allows access to be restricted to individuals rather than to computers. One such technique is described below; it is based on the SunDES authentication mechanism used by the Sun Secure Remote Procedure Call package marketed by Sun Microsystems, Mountain View, Calif. (Sun is a registered trademark of Sun Microsystems).

The SunDES authentication mechanism provides a new "address family" in the X Window System which is called NetName. The NetName for a particular user is the name by which that user is addressed within the X Window System. The term "user" as employed in this specification means a person having authorization to use the host computer. Since NetName is arranged as a new address family, it, like other address families, may be called by the X Windows ChangeHosts command to add and remove particular Net Names from the authorized list and by the ListHosts command to examine the names on the list. By providing NetName as a new address family, it is not necessary to add additional commands to the X Window System to access Net-Names.

For each user of X Windows, a network-wide data base holds the NetName of the user, a public key, and a secret key encrypted with the user's password. It should be made clear at this point that many individuals may make up a single user under the same NetName if is it desirable to have them all working on a single project. Alternatively, a single person might have multiple Net-Names representing different levels of security classification. A public key is an encryption coding device by which persons wishing to send encrypted messages to a single individual use that individual's public key to encrypt the message. The public key is, in effect, a code which an individual may give out to persons he wishes to address messages to him so that they may encrypt the messages for his receipt only. A secret key is a key used by the individual to decrypt those messages directed to him. Again, a secret key is a coded sequence which allows that individual only to decode the message addressed to him and encrypted by others by means of the public key.

The use of a public key and a secret key is known in the art as public key cryptography. For the means of encryption and decryption in the present invention, any public key cryptographic algorithm could be employed as long as it may be either encrypted with a public key and decrypted with a secret key, or encrypted with a secret key and decrypted with a public key.

When a user logs onto a host, the user password is used to decrypt his secret key and store it on the host computer. A process (called here a client) that wishes to contact the server constructs a credential encrypted with the server's public key and containing the Net-Name of the client and a verifier including a time stamp to prevent replays of the particular message. The verifier is encrypted using the client's secret key. When the server receives the credential, the server uses its secret key to decrypt the credential. It then uses the client's public key to decrypt the verifier. Presuming the verifier can be decrypted by the client's public key, the server knows that only the user could have generated that credential. The credential is then checked against the network-wide database to determine the authorization of the particular user.

The manner in which the X Window System is changed in order to accomplish the above-described authorization is as follows. First the interface in the server to the authorization mechanism is altered to allow for multiple authorization mechanisms, and the host-based mechanism code is recast to fit into this new framework. The client X routine _XSendClientPrefix is altered to generate a suitable credential and transmit it to the server. To generate the credential, the routine needs (a) the client's NetName and (b) the server's Net-Name. The client's NetNAme is obtained from the client's operating system, and the server's NetName from an environment variable XNETNAME. If the environment variable XNETNAME is supplied, then a particular user is designated. If a name is not supplied in the environment position for the routine, the routine assumes that the NetName of the user running the server is the same as that of the user running the client.

An authorization mechanism is implemented in the server, alongside the host-based mechanism, that takes the credential from a client, decrypts it to obtain the NetName of the user running the client, and compares the NetName with the net names in the authorized list. If there is no comparison, the connection is refused.

This authorization mechanism also maintains the list of authorized net names. It adds and deletes entries when a ChangeHost request with the family name Net-Name is encountered. The authorization mechanism also returns the entries from the list on a ListHost request. The routine clients/xhost/xhost.c is also modified to enable it to understand the NetName address family. Furthermore, the files clients/xdm/verify.c and clients/xdm/session.c are modified to set up the X Net-Name environment variable for the session to provide the NetName of the user running the server, to set up the initial authorized NetName list of the server so that the user who logged in is allowed to talk to the server, and to inform the host that the user has successfully logged on.

Included in Appendix A to this specification is the C language source code utilized to accomplish the foregoing limitation of access to only authorized users. A description of the steps for accomplishing authorization is illustrated in FIG. 1.

2. Access Control

In order to prevent different users sharing an X server from interfering with or observing each other, the system of this invention provides the set of clients being run on behalf of each new user (more precisely, the set of clients authenticated under a single NetName or other authenticator) the illusion that they are the only clients using that server. In other words, clients under authenticator A can neither observe nor affect the operation of clients under authenticator B.

To provide this illusion, the system of this invention insures that attempts by a client to name resources in the server, such as windows, created by some other client under a different authenticator will behave as if the resources had never been created. Further, attempts by a client to enquire about the existence and attributes of resources in the server will never return the names of resources created by clients under other authenticators. Since the client cannot discover the names of the resources, nor operate on them even if it could discover their names, the necessary isolation between authenticators is achieved.

This is accomplished in the present invention in the following manner. Clients (application programs) operate on resources in the X server by specifying a resource ID for them. Resource IDs form a flat 29-bit name space. Some resources, and the corresponding IDs, are generated by the server itself, and others by a client. At connection startup, each client is given a part of the resource ID space that it can use to generate IDs; it can access resources with IDs inside this space, but attempts to create resources with IDs outside its allocated space will fail with an IDChoice error. Since there are many more bits provided in the 29-bit name space than are necessary for client identification, some of these bits are utilized to provide user identification.

Figure 2:
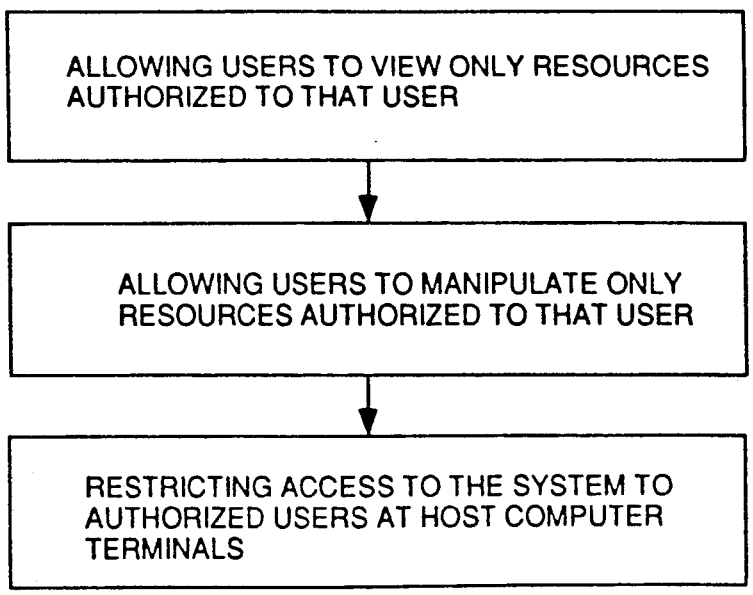
FIG. 2 is a flow chart describing the operation of the invention in more particular detail.

FIG. 1 illustrates the manner in which access to the X Window server is provided in the standard arrangement of the prior art and in a server operating in accordance with the present invention. The upper diagram of FIG. 1 illustrates that in the prior art arrangement space is allocated to the server and to each individual client by means of the 29-bit name space. Any user may then access any of the clients. By allocating some of the most significant bits to the user identification as shown in the illustration of the second diagram in FIG. 2, the division of space is broken into much larger blocks each of which includes space for the client programs which can be viewed only by a single user (those using a single authenticator). In the illustration of the second diagram in FIG. 2, the first block is allocated to the server and to clients of a window manager, a so-called privileged user. The next block of space is allocated to a user one for its clients and the next block to a user two and its clients.

The system ensures that attempts by clients to name (and thereby operate on) resources that were created by a client authorized under some other authenticator fail, just as they would have had the other client never created the resource. X Windows provides no resource ID for a client as such, only for resources created by the client. Since a client cannot name resources created by clients with other authenticators, it has no idea that these other clients exist. Thus, user one is only able to operate upon those clients in its user space. In like manner, user two is only able to operate upon those clients in its user space.

The problem is not as straightforward as it may seem. A client has to be able to name some resources not created by clients under its authenticator. In particular, normal clients must be able to name resources created by the server, such as the root window of the display, in order to operate normally; and some privileged clients must be able to name and operate on all resources. Without this, a system would require that each user accessing an X server run a separate window manager to manipulate only that user's windows.

To deal with this, the invention introduces the concept of authenticator zero; clients under authenticator zero can name all resources irrespective of who created them, and all clients can name resources created by clients under authenticator zero. In other words, to clients under authenticator zero the X server believes as it would normally, there are no restrictions. Authenticator zero refers to the user running the server itself, thus resources created by the server may be named by all clients. Normally, the window manager and a special selection agent are the only actual clients run under authenticator zero. The space allocated to the server and to authenticator zero is the space to the far left in the diagram on the second line of FIG. 1.

Thus, the actual goal of the invention is to provide each set of clients authorized under a single non-zero authenticator (normal clients) the illusion that they, and the clients authorized under authenticator zero (privileged clients), are the only clients connected to the server. However, this is not in itself sufficient to ensure that the system is reasonably secure against malicious clients. As pointed out, normal clients must not be able to observe the operations of other normal clients, for example by snooping on keystrokes directed to them. Moreover at least one additional restriction is required; normal clients must not be able to destroy or modify a privileged client's resources.

The implementation of this design involves changing the routine that approves each authenticator to return an unique 32-bit value characteristic of each valid authenticator. AddHost and RemoveHost maintain an array of up to thirty-two such 32-bit values. Each client is labelled with the index in this array of its authenticator. The interface to LookupID() is changed to include a client pointer. Each time a resource ID is looked up, the bits making up the user identification are ORed into the ID. This leaves twenty-four of the twenty-nine bits for use as a normal ID, enough for sixty-four simultaneous clients with each authenticator. Before calling the FreeResource routine, the extra five bits are masked off.

Thus, a system, X Windows, which is inherently non-secure to a user authenticated to use the system is rendered substantially more secure through the method of precluding that user from knowing that processes and users for which he is not authenticated exist. A user coming online and providing the correct NetName user identification and secret password sees only processes which he is allowed to see and is able to obtain the names of other processes and users only if they are within in the ambient of his authorization.

The implementation and design of this invention involves changing a number of routines and providing a list of authenticated codes for each individual client.

Specific tests were added to the following routines in order to accomplish the isolation of each individual user to its authenticated area:

CreateWindow and ReparentWindow—the parent must be able to name the child and vice versa.

QueryTree—don't return any children that the caller cannot name.

GetSelectionOwner—return None if the caller cannot name the owner.

ConvertSelection—refuse the conversion if the requestor cannot name the owner.

TranslateCoordinates—return None if the caller cannot name the child.

ListInstalledColormaps—do not include any unnameable colormaps in the returned list.

GetInputFocus—return None if the caller cannot name the focus window.

QueryPointer—return None if the caller cannot name the child window.

ChangeWindowAttributes and GetWindowAttributes—ensure that the window can name the colormap.

Configure Window—ensure that the above Sibling is a window that the client can name.*

In addition, a normal client cannot change or in any way interfere with the resources created by a normal client under some other authenticator because it cannot name them. But it can name the resources created by the server itself, and by privileged clients. To prevent malicious clients interfering with the work of the privileged clients, changes are needed to prevent a normal client changing or destroying privileged client's resources.

Normal clients could use the DestroyWindow, DestroySubwindows, MapWindow, MapSubwindows, UnmapWindow, UnmapSubwindows, ConfigureWindow, ReparentWindow, ChangeWindowAttributes, ChangeSaveSet and FreePixmap requests to interfere with privileged clients, such as those used by the window manager. Changing these requests to fail if the client is unprivileged and if it did not create the windows causes no problems for normal clients. Similarly, normal clients could interfere with the appearance of a privileged client by drawing in its windows and pixmaps. Changing the drawing requests to fail if the client is unprivileged and the drawable was created by a privileged client causes no problems for normal clients.

Normal clients could interfere with privileged client's cursors by using the FreeCursor and RecolorCursor requests. Changing these processes to fail if the client is unprivileged and the cursor was created by a privileged client causes no problems for normal clients.

Normal clients could free the fonts being used by a privileged client. Changing the FreeFont request to fail if the client is unprivileged and the font was opened by a privileged client cures this possible problem.

Normal clients could free a graphics context being used by a privileged client. Changing the FreeFont request to fail if the graphics context was not created by the requesting client will cause no problems; graphics contexts should not be shared between clients at all.

Normal clients could free a colormap being used by a privileged client. Changing FreeColormap to fail if the client is unprivileged and the colormap was created by a privileged client should not cause any problems; only privileged clients should be destroying shared colormaps.

Normal clients could use ChangeProperty, DeleteProperty or RotateProperties to alter properties on windows belonging to privileged clients. Restricting normal clients to using these requests on their own windows will not cause problems. According to the Inter-Client Communication Conventions manual, a normal client requesting the conversion of a selection has to supply one of its own windows. The owner (in this case the privileged selection agent) has to store the reply properties on this window. There is thus no reason for normal clients to be storing or changing properties on windows they don't own.

Included in Appendix B to this specification is the C language source code utilized to accomplish the foregoing limitations of users who have access to the system. The steps for accomplishing access control are illustrated broadly in FIG. 2.

Although various methods have been described for making more secure the operation of a server system running the X Window System, various other extensions of the present invention and variations therein will be obvious to those skilled in the art without departing from the spirit and scope of the invention. The invention should therefore be measured by the claims which follow.

1. Changes to "X11/X.h"

The file X11/X.h, which is included by both clients and server, is modified to include the names for an additional "address family" for use by the ChangeHosts X request.

```
*** /tmp/da1042 Wed Mar 15 20:01:26 1989
--- X11/X.h     Tue Mar  7 20:50:16 1989
**************
*** 244,249 ****
--- 244,253 ----
   #define FamilyInternet           0
   #define FamilyDECnet             1
   #define FamilyChaos              2
 + #ifdef       SunDESAccessControl
 + #define      FamilySunDES    3
 + #define      SunDES1 "Sun_DES_1"
 + #endif       /* SunDESAccessControl */

/* Property notification */
```

2. Changes to "lib/X/XConnDis.c"

The file lib/X/XConnDis.c is changed to send the appropriate authenticator from the client to the server in the connection handshake. First, the code that constructs the authenticator:

APPENDIX A

```
*** /tmp/da1046 Wed Mar 15 20:01:29 1989
--- lib/X/XConnDis.c'   Wed Mar 15 14:56:42 1989
***************
*** 386,391 ****
--- 419,462 ----
        } while (result <= 0);
    }

+ #ifdef        SunDESAccessControl
+ /*
+  * Encodes a credential to send to netname servername get servername with
+  * host2netname or user2netname returns the length in len window is the
+  * credential lifetime
+  * aa returns the credential so that the key can be used later.
+  */
+
+ char           *
+ authdes_ezencode(servername, window, len, aa)
+         char            *servername;
+         int             window;
+         int             *len;
+         AUTH            **aa;
+ {
+         char            *cred_out;
+         AUTH            *a;
+         XDR             xdr;
+         cred_out = (char *) Xmalloc(MAX_AUTH_BYTES);
+         if (cred_out == NULL)
+                 return (NULL);
+         a = authdes_create(servername, window, NULL, NULL);
+         *aa = a;
+         if (a == (AUTH *)NULL) {
+                 perror("authdes_create");
+                 return (NULL);
+         }
+         xdrmem_create(&xdr, cred_out, MAX_AUTH_BYTES, XDR_ENCODE);
+         if (AUTH_MARSHALL(a, &xdr) == FALSE) {
+                 perror("authdes_marshal");
+                 return (NULL);
+         }
+         *len = xdr_getpos(&xdr);
+         return (cred_out);
+
+ }
+ #endif        /* SunDESAccessControl */
+
    static int padlength[4] = {0, 3, 2, 1};

_XSendClientPrefix (dpy, client)
```

Next the code that sends it:

```
***************
*** 406,413 ****
--- 477,505 ---- int bytes=0;

+ #ifdef        SunDESAccessControl
```

```
+        char mynetname[MAXNETNAMELEN];
+        char *servernetname;
+        AUTH *a;
+
+        if ((servernetname = getenv(SERVERNETNAME)) == NULL) {
+            /*
+             * By deafult, we assume that we are the same user
+             * as the one running the server, so that the normal
+             * case works OK, except if we're running xdm. In that
+             * case, we need this assumption to get bootstrapped.
+             */
+            getnetname(mynetname);
+            servernetname = mynetname;
+        }
+        auth_string = authdes_ezencode(servernetname, 100, &auth_strlen, &a);
+        AUTH_DESTROY(a);
+        auth_proto = SunDES1;
+        auth_length = sizeof(SunDES1);
+ #else  /* SunDESAccessControl */
         auth_length = strlen(auth_proto);
         auth_strlen = strlen(auth_string);
+ #endif        /* SunDESAccessControl */
         client->nbytesAuthProto = auth_length;
         client->nbytesAuthString = auth_strlen;
```

3. Changes to the server

In the server, the file os/4.2bsd/access.c is modified to provide an interface for a different authentication mechanism for each address family. The existing ones all use the host-based authentication mechanism:

```
--- 94,323 ----
   #include <netdnet/dn.h>
   #include <netdnet/dnetdb.h>
   #endif !  #ifdef UNIXCONN
!  #include <sys/un.h>
!  #endif
!  static int HBPAddHost();
!  static int HBPRemoveHost();
!  static int HBPGetHosts();
!  static int HBPDefineSelf();
!  static int HBPResetHosts();
!  static int HBPTestConnection();
!  #endif        /* HostBasedAccessControl */

!  #ifdef      SunDESAccessControl

!  static int SunDESAdd();
!  static int SunDESRemove();
!  static int SunDESGet();
!  static int SunDESSelf();
!  static int SunDESReset();
!  static int SunDESTest();
!  #endif        /* SunDESAccessControl */
!  /*
!   * In order to support multiple authorization mechanisms without needing
!   * an extension, we overload the concept of "family". In this way, we
!   * can treat the ChangeHosts protocol request as simply shipping unswapped
!   * data.
!   */
   typedef struct {
!       int af;              /* OS name for "family" */
```

```
!       int     xf;                     /* X name for "family" */
!       int     (*Add)();               /* Add authenticator */
!       int     (*Remove)();            /* Remove authenticator */
!       int     (*Get)();               /* Get authenticators */
!       int     (*Self)();              /* Define "self" on this FD */
!       int     (*Reset)();             /* Initialize authentication */
!       int     (*Test)();              /* Test new connection */
!       char    *name;
  } FamilyMap;

static FamilyMap familyMap[] = {
+ #ifdef        HostBasedAccessControl
  #ifdef        AF_DECnet
!       {AF_DECnet, FamilyDECnet,
!        HBPAddHost, HBPRemoveHost, HBPGetHosts, HBPDefineSelf, HBPResetHosts,
!        HBPTestConnection, "host"},
  #endif /* AF_DECnet */
  #ifdef        AF_CHAOS
!       {AF_CHAOS, FamilyChaos,
!        HBPAddHost, HBPRemoveHost, HBPGetHosts, HBPDefineSelf, HBPResetHosts,
!        HBPTestConnection, "host"},
  #endif /* AF_CHAOS */
  #ifdef        AF_INET
!       {AF_INET, FamilyInternet,
!        HBPAddHost, HBPRemoveHost, HBPGetHosts, HBPDefineSelf, HBPResetHosts,
!        HBPTestConnection, "host"},
  #endif
+ #endif        /* HostBasedAccessControl */
+ #ifdef        SunDESAccessControl
+       {0, FamilySunDES,
+        SunDESAdd, SunDESRemove, SunDESGet, SunDESSelf, SunDESReset,
+        SunDESTest, SunDES1}
+ #endif        /* SunDESAccessControl */
  };
```

Based on this interface, the SunDES authetication mechanism is now implemented:

```
+ #ifdef        SunDESAccessControl
+ #include <sys/param.h>                /* for NGROUPS */
+ #include <rpc/rpc.h>
+ #include <pwd.h>
+ #include <grp.h>
+
+ /*
+  * takes a message and len and either returns a cooked credential including
+  * netname and a session key for further encryption why is why it didn't work
+  * or AUTH_OK if it worked.
+  */
+ struct authdes_cred *
+ authdes_ezdecode(inmsg, len, why)
+       char            *inmsg;
+       int             len;
+       enum auth_stat  *why;
+ {
+       struct rpc_msg  msg;
+       char            cred_area[MAX_AUTH_BYTES];
+       struct svc_req  r;
+       XDR             xdr;
+       SVCXPRT         xprt;
+
+
+       bzero(&msg, sizeof(msg));
+       bzero(&r, sizeof(r));
+       xdrmem_create(&xdr, inmsg, len, XDR_DECODE);
+       msg.rm_call.cb_cred.oa_base = cred_area;
```

```
+        msg.rm_call.cb_verf.oa_base = &(cred_area[MAX_AUTH_BYTES]);
+        *why = AUTH_FAILED;
+        if ((r.rq_clntcred = (caddr_t) Xalloc(MAX_AUTH_BYTES)) == NULL)
+            goto bad1;
+        r.rq_xprt = &xprt;
+
+        /* decode into msg */
+        if (!(xdr_opaque_auth(&xdr, &(msg.rm_call.cb_cred)) &&
+            xdr_opaque_auth(&xdr, &(msg.rm_call.cb_verf)))) {
+            goto bad2;
+        }
+        /* do the authentication */
+
+        r.rq_cred = msg.rm_call.cb_cred;        /* read by opaque stuff */
+        if (r.rq_cred.oa_flavor != AUTH_DES) {
+            *why = AUTH_TOOWEAK;
+            goto bad2;
+        }
+        if ((*why = _authenticate(&r, &msg)) != AUTH_OK) {
+            goto bad2;
+        }
+        return ((struct authdes_cred *) r.rq_clntcred);
+
+ bad2:
+        Xfree(r.rq_clntcred);
+ bad1:
+        return ((struct authdes_cred *) NULL);
+ }
```

Now the code that reports on the cause if thinsg go wrong:

```
+ /* generate error message string in */
+ char          *
+ auth_errmsg(stat)
+        enum auth_stat  stat;
+ {
+        char *msg;
+
+        switch (stat) {
+        case AUTH_OK:
+ #define       STR     "Authentication OK"
+            if ((msg = (char *) Xalloc(sizeof(STR))) != NULL)
+                strcpy(msg, STR);
+ #undef        STR
+            break;
+        case AUTH_BADCRED:
+ #define       STR     "Invalid client credential"
+            if ((msg = (char *) Xalloc(sizeof(STR))) != NULL)
+                strcpy(msg, STR);
+ #undef        STR
+            break;
+        case AUTH_REJECTEDCRED:
+ #define       STR     "Server rejected credential"
+            if ((msg = (char *) Xalloc(sizeof(STR))) != NULL)
+                strcpy(msg, STR);
+ #undef        STR
+            break;
+        case AUTH_BADVERF:
+ #define       STR     "Invalid client verifier"
+            if ((msg = (char *) Xalloc(sizeof(STR))) != NULL)
+                strcpy(msg, STR);
+ #undef        STR
+            break;
+        case AUTH_REJECTEDVERF:
+ #define       STR     "Server rejected verifier"
+            if ((msg = (char *) Xalloc(sizeof(STR))) != NULL)
+                strcpy(msg, STR);
```

```
+ #undef     STR
+            break;
+       case AUTH_TOOWEAK:
+ #define    STR     "Client credential too weak"
+            if ((msg = (char *) Xalloc(sizeof(STR))) != NULL)
+                strcpy(msg, STR);
+ #undef     STR
+            break;
+       case AUTH_INVALIDRESP:
+ #define    STR     "Invalid server verifier"
+            if ((msg = (char *) Xalloc(sizeof(STR))) != NULL)
+                strcpy(msg, STR);
+ #undef     STR
+            break;
+       case AUTH_FAILED:
+ #define    STR     "Failed (unspecified error)"
+            if ((msg = (char *) Xalloc(sizeof(STR))) != NULL)
+                strcpy(msg, STR);
+ #undef     STR
+            break;
+       default:
+ #define    STR     "Unknown authentication error"
+            if ((msg = (char *) Xalloc(sizeof(STR))) != NULL)
+                strcpy(msg, STR);
+ #undef     STR ,
+            break;
+       }
+       return (msg);
+ };
```

Next the code that maintains a list of authorized net names:

```
+
+ /* There's one of these for each authorized netname */
+ typedef struct _goodguy {
+     struct _goodguy *next;
+     short           nName;
+     char            *name;
+ } GOODGUY;
+
+ static GOODGUY *goodguys = NULL;
+
+ /*
+  * The length bytes pointed to by pAddr contain a netname that is
+  * to be authorized to connect to the server.  Since anyone who
+  * is connected to the server can be assumed to be a good guy,
+  * there's no need to check who's doing this.
+  */
+ static int
+ SunDESAdd (client, family, length, pAddr)
+     ClientPtr       client;
+     int             family;
+     unsigned        length;         /* of bytes in pAddr */
+     pointer         pAddr;
+ {
+     register GOODGUY *guy = goodguys;
+
+     while (guy) {
+        if (length == guy->nName
+           && strncmp(guy->name, (char *)pAddr, length) == 0) {
+               /* This guy's already authorized */
+               return (Success);
+        }
+        guy = guy->next;
+     }
```

```
+       if ((guy = (GOODGUY *) Xalloc(sizeof (GOODGUY))) == NULL)
+           return (BadAlloc);
+       guy->nName = length;
+       if ((guy->name = (char *) Xalloc(length + 1)) == NULL) {
+           Xfree(guy);
+           return (BadAlloc);
+       }
+       strncpy(guy->name, (char *)pAddr, length);
+       guy->name[length] = ' ';
+       guy->next = goodguys;
+       goodguys = guy;
+       return (Success);
+ }
+
+ /*
+  * The length bytes pointed to by pAddr contain a netname that is
+  * to be removed from the set authorized to connect to the server.
+  */
+ static int
+ SunDESRemove (client, family, length, pAddr)
+       ClientPtr       client;
+       int             family;
+       unsigned        length;         /* of bytes in pAddr */
+       pointer         pAddr;
+ {
+       register GOODGUY *guy = goodguys, **prev;
+       for (prev = &goodguys; (guy = *prev); prev = &guy->next) {
+           if (length == guy->nName
+               && strncmp(guy->name, (char *)pAddr, length) == 0) {
+               /* This guy is the one to zap */
+               *prev = guy->next;
+               Xfree (guy);
+               break;
+           }
+       }
+       /* I'm assuming that removing someone not in the list is OK */
+       return (Success);
+ }
```

Now code allowing entries in the list to be read:

```
+ /*
+  * *pnHosts is set to the number of netnames in the authorization list,
+  * and *data is set to point to an xalloc()ed array containing an
+  * xHostEntry struct for each of them, each followed by the netname
+  * itself. *pEnabled is set to indicate the state of the AccessEnabled
+  * flag (NB - this is misleading, since this mechanism ignores the flag).
+  */
+ static int
+ SunDESGet (data, pnHosts, pEnabled)
+       pointer         *data;
+       int             *pnHosts;
+       BOOL            *pEnabled;
+ {
+       int             *lengths = (int *) NULL;
+       int             n = 0;
+       int nGuys = 0;
+       register pointer ptr;
+       register GOODGUY *guy = goodguys;
+
+       *pEnabled = AccessEnabled ? EnableAccess : DisableAccess;
+       while (guy) {
+           lengths = (int *) Xrealloc(lengths, (nGuys + 1) * sizeof (int));
+           if (lengths == NULL) {
+               return (0);
```

```
+            }
+            lengths[nGuys++] = guy->nName;
+            n += (((guy->nName + 3) >> 2) << 2) + sizeof(xHostEntry);
+            guy = guy->next;
+        }
+        if (n) {
+            *data = ptr = (pointer) Xalloc(n);
+            if (ptr == NULL) {
+                Xfree(lengths);
+                return 0;
+            }
+            nGuys = 0;
+            guy = goodguys;
+            while (guy) {
+                int len;
+
+                len = lengths[nGuys++];
+                ((xHostEntry *)ptr)->family = FamilySunDES;
+                ((xHostEntry *)ptr)->length = len;
+                ptr += sizeof(xHostEntry);
+                bcopy(guy->name, (char *)ptr, len);
+                ptr += ((len + 3) >> 2) << 2;
+                guy = guy->next;
+            }
+        }
+        *pnHosts = nGuys;
+        Xfree(lengths);
+        return (n);
+ }
```

Now the code that is called when the handshake arrives on a new connection:

```
+ /*
+  * Authorize (or réfuse) the new connection on FD "conn". Non-zero
+  * means OK.
+  */
+ static int
+ SunDESTest (conn, pswapped, reason, nPro, auth_proto, nStr, auth_string)
+     long conn;              /* FD for new connection */
+     int *pswapped;          /* connection needs swapping */
+     char **reason;          /* if fails, put reason here */
+     int nPro;               /* length of auth proto name */
+     char *auth_proto;       /* string name of auth proto */
+     int nStr;               /* length of auth proto data */
+     char *auth_string;      /* data for auth proto */
+ {
+     enum auth_stat why;
+     struct authdes_cred *thecred;
+     register GOODGUY *guy = goodguys;
+
+     if (strncmp(SunDES1, auth_proto, nPro) != 0) {
+
+         register char *msg;
+
+ #define     STR "Sun_DES_1 authorization required"
+         if ((msg = (char *) Xalloc(sizeof(STR))) != NULL)
+             strcpy(msg, STR);
+ #undef      STR
+         return (0);
+     }
+     /* decode credential */
+     thecred = authdes_ezdecode(auth_string, nStr, &why);
+     if (why != AUTH_OK) {
+         *reason = auth_errmsg(why);
+         return (0);
```

```
+        }
+
+        while (guy) {
+            if (strcmp(guy->name, thecred->adc_fullname.name) == 0) {
+                /* This guy is authorized */
+                free(thecred);
+                return (1);
+            }
+            guy = guy->next;
+        }
+        free(thecred);
+ #define     STR "User is not authorized"
+        if ((*reason = (char *) Xalloc(sizeof(STR))) != NULL)
+            strcpy(*reason, STR);
+ #undef      STR
+        return (0);
+ }
+ #endif           /* SunDESAccessControl */
```

1. Changes to "resource.h"

The following code is added to *resource.h* to define how the client's index into the table of active authenticators is or-ed into the resource ID.

```
/*
 * We have a total of 12 bits for the client ID, but there are just
 * MAXCLIENT (currently 128) possible clients. So the 5 high bits
 * of the resource ID are unused. We use these bits internally:
 * -   Each client is authorized under some authenticator ("user ID").
 * -   Each new authenticator is entered into a table, indexed
 *     by a 5-bit field (there can thus be 32 different user IDs
 *     active).
 * -   Before looking-up a resource ID, we or the index for the
 *     current client's authenticator into the top 5 bits. In this
 *     way, clients authorized under a specific authenticator see
 *     a resource ID space that is independent from that seen by
 *     clients under another authenticator.
 * -   As a special case, if the resource ID being looked-up was
 *     created by a client with authentication table index 0,
 *     the looking-up client's index is not or-ed into the ID,
 *     so that all clients see resources created under this
 *     authenticator.
 */
#define AUTH_INDEX(client)    ((client)->auth_index)
#define AUTH_INDEX_SHIFT      27
#define AUTH_INDEX_MASK       0xf8000000
```

2. Changes to "resource.c"

An *auth_index* field is added to the ClientResourceRec struct that the server uses to represent a client. It stores the value that will be or-ed into the resource IDs.

```
typedef struct _ClientResource {
    ResourcePtr *resources;
    int         elements;
    int         buckets;
    int         hashsize;    /* log(2)(buckets) */
    XID         fakeID;
    unsigned    auth_index;
} ClientResourceRec;
```

APPENDIX B

When the ClientResourceRec for a new client is initialized, the *auth_index* field is initialized to the (appropriately shifted) index into the table of active authenticators.

```
InitClientResources(client)
    ClientPtr client;
{
    register int i, j;

if (client == serverClient)
    {
        lastResourceType = RT_LASTPREDEF;
        lastResourceClass = RC_LASTPREDEF;
    }
    clientTable[i = client->index].resources =
        (ResourcePtr *)xalloc(INITBUCKETS*sizeof(ResourcePtr));
    clientTable[i].buckets = INITBUCKETS;
    clientTable[i].elements = 0;
    clientTable[i].hashsize = INITHASHSIZE;
    clientTable[i].fakeID = 100;
    for (j=0; j<INITBUCKETS; j++)
    {
        clientTable[i].resources[j] = NullResource;
    }
    clientTable[i].auth_index = client->auth_index << AUTH_INDEX_SHIFT;
}
```

When a client creates a new resource, the client's *auth_index* value is or-ed into the resource ID that the resource is identified by. In this way, the resources for each authenticator are stored in separate address spaces.

```
void
AddResource(id, type, value, func, class)
    XID id;
    unsigned short type, class;
    pointer value;
    int (* func)();
{
    int client;
    register int j;
    register ResourcePtr res, next, *head;

client = CLIENT_ID(id);
    if (!clientTable[client].buckets)
    {
        ErrorF("AddResource(%x, %d, %x, %d), client=%d 0,
                id, type, value, class, client);
        FatalError("client not in use0);
    }
    if (!func)
    {
        ErrorF("AddResource(%x, %d, %x, %d), client=%d 0,
                id, type, value, class, client);
        FatalError("No delete function given to AddResource 0);
    }
    /* If this is an auth index 0 client, this will have no effect.. */
    id |= clientTable[client].auth_index;
    if ((clientTable[client].elements >= 4*clientTable[client].buckets) &&
        (clientTable[client].hashsize < MAXHASHSIZE))
    {
        register ResourcePtr *resources = (ResourcePtr *)
            xalloc(2*clientTable[client].buckets*sizeof(ResourcePtr));
        for (j = 0; j < clientTable[client].buckets*2; j++)
            resources[j] = NullResource;
        clientTable[client].hashsize++;
        for (j = 0; j < clientTable[client].buckets; j++)
        {
            /*
```

```
                 * Must preserve insertion order so that FreeResource doesn't free
                 * "subclasses" before main resources are freed.  Sigh.
                 */
                for (res = clientTable[client].resources[j]; res; res = next)
                {
                    next = res->next;
                    head = &resources[Hash(client, res->id)];
                    while (*head)
                        head = &(*head)->next;
                    *head = res;
                    res->next = NullResource;
                }
            }
            clientTable[client].buckets *= 2;
            xfree(clientTable[client].resources);
            clientTable[client].resources = resources;
        }
        head = &clientTable[client].resources[Hash(client, id)];
        res = (ResourcePtr)xalloc(sizeof(ResourceRec));
        res->next = *head;
        res->id = id;
        res->DeleteFunc = func;
        res->type = type;
        res->class = class;
        res->value = value;
        *head = res;
        clientTable[client].elements++;
}
```

When a resource is freed, the client's *auth_index* value is or-ed into the resource ID before it is freed. In this way, the client can only free resources created under its authenticator.

```
void
FreeResource(id, skipDeleteFuncClass)
XID  id;
int  skipDeleteFuncClass;

{
    int           cid;
    register      ResourcePtr res;
    register      ResourcePtr *prev, *head;
    register      int *eltptr;
    int           elements;
    Bool          gotOne = FALSE;

if (((cid = CLIENT_ID(id)) < MaxClients) && clientTable[cid].buckets)
    {
        int realid = id;
        /* If this is an auth index 0 client, this will have no effect.. */
        id |= clientTable[cid].auth_index;
        head = &clientTable[cid].resources[Hash(cid, id)];
        eltptr = &clientTable[cid].elements;

prev = head;
        while (res = *prev)
        {
            if (res->id == id)
            {
                *prev = res->next;
                elements = --*eltptr;
                if (res->type & CACHEDTYPES)
                    FlushClientCaches(realid);
                if (skipDeleteFuncClass != res->class)
                    (*res->DeleteFunc) (res->value, realid);
                xfree(res);
```

```
            if (*eltptr != elements)
                prev = head; /* prev may no longer be valid */
            gotOne = TRUE;
        }
        else
            prev = &res->next;
    }
    if(clients[cid] && (id == clients[cid]->lastDrawableID))
    {
        clients[cid]->lastDrawable = (DrawablePtr) NULL;
        clients[cid]->lastDrawableID = INVALID;
    }
}
if (!gotOne)
    FatalError("Freeing resource id=%X which isn't there", id);
}
```

When the client looks up a resource, *auth_index* field is or-ed into the resource ID to ensure that the search is made only within the authenticator's address space.

```
    pointer
    LookupID(id, rType, class, client)
        XID id;
        unsigned short rType, class;
        ClientPtr client;
{
    int     cid;
    register    ResourcePtr res;

if (((cid = CLIENT_ID(id)) < MaxClients) && clientTable[cid].buckets)
    {
        /*
         * If the resource wasn't created by an AUTH_INDEX 0 client,
         * it may not be visible to me.
         */
        unsigned him = clientTable[cid].auth_index;

if (him != 0) {
            /*
             * If I'm an AUTH_INDEX 0 client,  OR in his index to make
             * sure the resource is visible.  Otherwise,  OR in my index
             * to see if it is visible.
             * No need to clear auth index field before OR because
             * of test above.
             */
            unsigned me = clientTable[client->index].auth_index;

id |= (me != 0 ? me : him);
        }
        res = clientTable[cid].resources[Hash(cid, id)];

for (; res; res = res->next)
            if ((res->id == id) && (res->class == class))
                if (res->type & rType)
                    return res->value;
                else
                    return(pointer) NULL;
    }
    return(pointer) NULL;
}
```

For certain specific tests (see below) there is a requirement to establish that a client (the one that created resource *b*) can see a resource *a*.

```
    int
    IsVisibleTo(a, b)
```

```
    XID a;
    XID b;
{
    int id_a, id_b;

id_a = CLIENT_ID(a);
    id_b = CLIENT_ID(b);
    if (id_a < MaxClients && id_b <MaxClients) {
        unsigned indx_a, indx_b;

if ((indx_a = clientTable[id_a].auth_index) == 0 ||
          (indx_b = clientTable[id_b].auth_index) == 0 ||
          (indx_b == indx_a)) {
            /*
             * Either was created by an AUTH_INDEX 0 client,
             * or the clients had the same AUTH_INDEX.
             */
            return 1;
        }
    }
    return 0;
}
```

For certain specific tests (see below) there is a need to establish that a client can see a resource even if it doesn't yet exist.

```
int
IsOneOfOurs(id, client)
    XID id;
    ClientPtr client;
{
    return (clientTable[client->index].auth_index == 0 ||
        clientTable[client->index].auth_index ==
        clientTable[CLIENT_ID(id)].auth_index);
}
```

3. Changes to "dispatch.c"

These changes serve as examples of the global changes.

When a window is created as a child of some existing parent window, it is necessary to ensure that the parent window can name the child using *IsVisibleTo()*.

```
int
ProcCreateWindow(client)
    register ClientPtr client;
{
    register WindowPtr pParent, pWin;
    REQUEST(xCreateWindowReq);
    int result;
    int len;

REQUEST_AT_LEAST_SIZE(xCreateWindowReq);

LEGAL_NEW_RESOURCE(stuff->wid, client);
    if (!(pParent = (WindowPtr)LookupWindow(stuff->parent, client)))
        return BadWindow;
    len = stuff->length - (sizeof(xCreateWindowReq) >> 2);
    if (Ones(stuff->mask) != len)
        return BadLength;
    if (!stuff->width || !stuff->height)
    {
        client->errorValue = 0;
        return BadValue;
```

```
        }
        pWin = CreateWindow(stuff->wid, pParent, stuff->x,
                                stuff->y, stuff->width, stuff->height,
                                stuff->borderWidth, stuff->class,
                                stuff->mask, (XID *) &stuff[1],
                                (int)stuff->depth,
                                client, stuff->visual, &result);
        if (pWin) {
            AddResource(stuff->wid, RT_WINDOW, (pointer)pWin, DeleteWindow, RC_CORE);
            /*
             * We need to make sure that
             * a parent can name all its children in case it sets
             * SubstructureRedirect.
             */
            if (!IsVisibleTo(stuff->wid, pParent->wid)) {
                FreeResource(stuff->wid, RC_NONE);
                client->errorValue = stuff->wid;
                return(BadValue);
            }
        }
        if (client->noClientException != Success)
            return(client->noClientException);
        else
            return(result);
}
```

When a client requests destruction of a window, it is necessary to make sure that the window was created by a client under the same authenticator using *IsOneOfOurs()*.

```
        int
        ProcDestroyWindow(client)
            register ClientPtr client;
        {
            register WindowPtr pWin;
            REQUEST(xResourceReq);

REQUEST_SIZE_MATCH(xResourceReq);
            pWin = (WindowPtr)LookupWindow(stuff->id, client);
            if (!pWin || !IsOneOfOurs(stuff->id, client))
                return(BadWindow);
            if (pWin->parent)
                FreeResource(stuff->id, RC_NONE);
            return(client->noClientException);
        }
```

When a client enquires the set of sub-windows of a window, the window must be one it can name. If so, it gets back resource IDs for:

- the root (which is known to have been created under authenticator zero)
- the parent of the window (elsewhere it is enforced that children can always name their parent)
- each child window that is visible to this client (checked using *LookupWindow()*)

```
        int
        ProcQueryTree(client)
            register ClientPtr client;
        {
            xQueryTreeReply reply;
            int numChildren = 0;
            register WindowPtr pChild, pWin, pHead;
            Window *childIDs = (Window *)NULL;
            REQUEST(xResourceReq);

REQUEST_SIZE_MATCH(xResourceReq);
            pWin = (WindowPtr)LookupWindow(stuff->id, client);
            if (!pWin)
```

```
            return(BadWindow);
    reply.type = X_Reply;
    /*
     * Returns a resource ID for the root.
     * We know that this was created by the server client.
     */
    reply.root = WindowTable[pWin->drawable.pScreen->myNum].wid;
    reply.sequenceNumber = client->sequence;
    /*
     * Returns a resource ID for the parent.
     * If we cannot name the parent return None, but this should
     * never happen (see ReparentWindow).
     */
    if (pWin->parent && LookupWindow(pWin->parent->wid, client))
        reply.parent = pWin->parent->wid;
    else
        reply.parent = (Window)None;

pHead = RealChildHead(pWin);
    for (pChild = pWin->lastChild; pChild != pHead; pChild = pChild->prevSib)
        if (LookupWindow(pChild->wid, client))
            numChildren++;
    if (numChildren)
    {
        int curChild = 0;

childIDs = (Window *) xalloc(numChildren * sizeof(Window));
        for (pChild = pWin->lastChild; pChild != pHead; pChild = pChild->prevSib)
            /*
             * Returns a resource ID for the child.
             * Don't return it if we can't name it.
             */
            if (LookupWindow(pChild->wid, client))
                childIDs[curChild++] = pChild->wid;
    } reply.nChildren = numChildren;
    reply.length = (numChildren * sizeof(Window)) >> 2;
    WriteReplyToClient(client, sizeof(xQueryTreeReply), &reply);
    if (numChildren)
    {
        client->pSwapReplyFunc = Swap32Write;
        WriteSwappedDataToClient(client, numChildren * sizeof(Window), childIDs);
        xfree(childIDs);
    } return(client->noClientException);
}
```

What is claimed is:

1. The method of rendering an X Window System including a server and at least one client process secure comprising the steps of:
   restricting access to the X Window server system to an authorized user at a host computer terminal using an address family, the address family being encrypted and decrypted using a standard public key cryptographic algorithm.
   allowing said user to view only resources of the X Window server system specifically authorized to that user and resources authorized to an authenticator zero, and
   allowing said user to manipulate resources of the X Window server system specifically authorized to that user and resources authorized to an authenticator zero.

2. The method of rendering an X Window System including a server and at least one client process secure as claimed in claim 1 in which the step of allowing said user to view only resources of the X Window server system specifically authorized to that user and resources authorized to an authenticator zero includes the steps of:
   placing a user identification in an identification of each resource created by the user that may be viewed by the creating user only, and
   placing an authenticator zero identification in the identification of each resource created by the user that may be viewed by any user.

3. The method of rendering an X Window System including a server and at least one client process secure as claimed in claim 2 in which the step of allowing said user to manipulate only resources of the X Window server system specifically authorized to that user and resources authorized to an authenticator zero includes the step of:

allowing said user to manipulate only resources containing resource identifications containing one of two user identifications, the two user identifications being the user identification indicating that user and the user identification indicating said authenticator zero.

4. The method of rendering an X Window System including a server and at least one client process secure as claimed in claim 1 in which the step of restricting access to the system to authorized users at host computer terminals comprises the steps of:

providing the address family recognizable by the X Window server system, the address family containing an authorized name for the user, providing a public key and a secret key for the user, the user's secret key being known only the user, storing the authorized name, the public key, and the secret key for the user in a network-wide server database, providing a public key and a secret key for the X Window server system, the server's public key being known to the user, and the server's secret key being known only to the server, generating a credential at a host computer terminal encrypted using a standard public key cryptographic algorithm and the server's public key, the credential containing the address family of the user and a verifier, the verifier comprising a time stamp to prevent replays of the credential, and being encrypted using the standard public key cryptographic algorithm and the user's secret key, decrypting the credential at the X Window server using the standard public key cryptography algorithm and the server's secret key to obtain the verifier, decrypting the verifier at the X Window server using the standard public key cryptography algorithm and the client's public key to obtain the address family of the user, and granting access to the X Window System upon matching of the decrypted address family with the address family recognizable by the X Windows server system as containing an authorized name for the user.

5. The method of rendering an X Window System including a server and at least one client process secure comprising the steps of:

restricting access to the X Window server system to a client process executing on behalf of an authorized user at a host computer terminal using an address family, the address family being encrypted and decrypted using a standard public key cryptographic algorithm, allowing the client process operating on behalf of a user to view only resources of the X Window System specifically authorized to the user and resources authorized to an authenticator zero, and allowing the client process to manipulate only resources of the X Window server system specifically authorized to the user and resources authorized to an authenticator zero.

6. The method of rendering an X Window System including a server and at least one client process secure as claimed in claim 5 in which the step of restricting access to the system to a client process executing on behalf of an authorized user at a host computer terminal comprises the steps of:

providing the address family recognizable by the X Window server system, the address family containing an authorized name for the user, providing a public key and a secret key for the user, the user's secret key being known only to the user, storing the authorized name, the public key, and the secret key for the user in a network-wide server database, providing a public key and a secret key for the X Window Server system, the server's public key being known to the user, and the server's secret key being known only to the server, generating a credential at a host computer terminal encrypted using the standard public key cryptographic algorithm and the server's public key, the credential containing the address family of the user and a verifier, the verifier comprising a time stamp to prevent replays of the credential, and being encrypted using the standard public key cryptographic algorithm and the user's secret key, decrypting the credential at the X Window server using the standard public key cryptography algorithm and the server's secret key to obtain the verifier, decrypting the verifier at the X Window server using the standard public key cryptography algorithm and the client's public key to obtain the address family of the user, and granting access to the X Window System upon matching of the decrypted address family with the address family recognizable by the X Windows server system as containing an authorized name for the user.

7. The method of rendering a networked window system including a server and at least one client process secure comprising the steps of:

restricting access to the networked window system to an authorized user at a host computer terminal using an address family, the address family being encrypted and decrypted using a standard public key cryptographic algorithm, allowing said user to view only the resources of the networked window system specifically authorized to that user, and resources authorized to an authenticator zero, and allowing said user to manipulate only resources of the networked window system specifically authorized to that user and resources authorized to an authenticator zero.

8. The method of rendering a networked window system including a server and at least one client process secure as claimed in claim 7 in which the step of restricting access to the system to an authorized user at a host computer terminal comprises the steps of:

providing the address family recognizable by the networked windows server system, the address family containing an authorized name for the user, providing a public key and a secret key for the user, the user's secret key being known only to the user, storing the authorized name, the public key, and the secret key for the user in a network-wide server database, providing a public key and a secret key for the networked window server system, the server's public key being known to the user, and the server's secret key being known only to the server, generating a credential at a host computer terminal encrypted using the standard public key cryptographic algorithm and the server's public key, the credential containing the address family of the user and a verifier, the verifier comprising a time stamp to prevent replays of the credential, and being encrypted using the standard public key cryptographic algorithm and the user's secret key, decrypting the credential at the networked window server using the standard public key cryptography algorithm and the server's secret key to obtain the verifier, decrypting the verifier at the networked window server using the standard public key cryptography algorithm and the client's public key to obtain the address family of the user, and granting access to the networked window system upon matching of the decrypted address family with the address family recognizable by the networked window server system as containing an authorized name for the user.

9. The method of rendering a networked window system including a server and at least one client process secure comprising the steps of:

restricting access to the networked window system to a client process executing on behalf of an authorized user at a host computer terminal using an address family, the address family being encrypted and decrypted using a standard public key cryptographic algorithm, allowing the client process operating on behalf of a user to view only resources of the networked window systems specifically authorized to the user and resources authorized to an authenticator zero, and allowing the client process to manipulate only resources of the networked window system specifically authorized to the user and resources authorized to an authenticator zero.

10. The method of rendering a networked window system including a server and at least one client process secure as claimed in claim 9 in which the step of restricting access to the system to a client process executing on behalf of an authorized user at a host computer terminal comprises the steps of:

providing the address family recognizable by the networked window system, the address family containing an authorized name for the user, providing a public key and a secret key for the user, the user's secret key being known only to the user, storing the authorized name, the public key, and the secret key for the user in a network-wide server database, providing a public key and a secret key for the networked window system, the server's public key being known to the user, and the server's secret key being known only to the server, generating a credential at a host computer terminal encrypted using the standard public key cryptographic algorithm and the server's public key, the credential containing the address family of the user and a verifier, the verifier comprising a time stamp to prevent the replay of the credential, and being encrypted using the standard public key cryptographic algorithm and the user's secret key, decrypting the credential at the networked window using the standard public key cryptography algorithm and the server's secret key to obtain the verifier, decrypting the verifier at the networked window server using the standard public key cryptographic algorithm and the client's public key to obtain the address family of the user, and granting access to the networked window system upon matching of the decrypted address family with the address family recognizable by the networked window system as containing an authorized name for the user.

* * * * *

UNITED STATES PATENT AND TRADEMARK OFFICE
CERTIFICATE OF CORRECTION

PATENT NO. : 5,073,933
DATED : December 17, 1991
INVENTOR(S) : Rosenthal It is certified that error appears in the above-identified patent and that said Letters Patent is hereby corrected as shown below:

In column 6 at line 23, please delete " believes " and insert -- behaves --.

Signed and Sealed this

First Day of July, 1997

Attest:

BRUCE LEHMAN

*Attesting Officer*   *Commissioner of Patents and Trademarks*